United States Patent [19]

McKnight et al.

[11] Patent Number: 4,655,992
[45] Date of Patent: Apr. 7, 1987

[54] REMOTE TEMPERATURE MEASUREMENT

[75] Inventors: James A. McKnight; Iain D. Macleod, both of Altrincham; Eric J. Burton, Chustleton, all of England

[73] Assignee: United Kingdom Atomic Energy Authority, London, England

[21] Appl. No.: 694,231

[22] Filed: Jan. 24, 1985

[30] Foreign Application Priority Data

Feb. 3, 1984 [GB] United Kingdom ................. 8402920

[51] Int. Cl.[4] ...................... G21C 17/02; G01K 11/24
[52] U.S. Cl. .................................... 376/247; 374/119; 374/117
[58] Field of Search ............... 374/117, 118, 119, 120, 374/123, 124, 127; 376/247, 252

[56] References Cited

U.S. PATENT DOCUMENTS

| 2,934,756 | 4/1960 | Kalmus | 374/119 |
| 3,169,117 | 2/1965 | Dickinson et al. | 376/171 |
| 3,810,138 | 5/1974 | Thompson et al. | 376/247 |
| 4,111,747 | 9/1978 | Eck et al. | 376/171 |
| 4,290,849 | 9/1981 | Uesugi et al. | 376/252 |
| 4,486,382 | 12/1984 | Gravelle et al. | 376/252 |

FOREIGN PATENT DOCUMENTS

| 3031678 | 3/1982 | Fed. Rep. of Germany | 374/119 |
| 0184522 | 10/1983 | Japan | 374/119 |
| 0184523 | 10/1983 | Japan | 374/119 |
| 0184524 | 10/1983 | Japan | 374/117 |
| 1035763 | 7/1966 | United Kingdom | 374/117 |
| 1178385 | 1/1970 | United Kingdom | 374/117 |
| 1178529 | 1/1970 | United Kingdom | 374/117 |
| 1202182 | 8/1970 | United Kingdom | 374/117 |
| 1300159 | 12/1972 | United Kingdom | 374/117 |
| 2002118 | 2/1979 | United Kingdom | 374/117 |
| 2066956 | 7/1981 | United Kingdom | 374/117 |
| 2114299 | 8/1983 | United Kingdom | 374/117 |

OTHER PUBLICATIONS

Epler, E. P., "Reliability of Reactor Systems", Nuclear Safety, vol. 4, No. 4, pp. 72–84, Jun. 1963.

Primary Examiner—Charles Frankfort
Assistant Examiner—Thomas B. Will
Attorney, Agent, or Firm—William R. Hinds

[57] ABSTRACT

Temperature, or temperature noise, is measured by employing an ultrasonic beam which strikes at least one pair of points (10A, 10B) which are a known distance apart and the time interval between the two points is resolved and related to the distance to give a measure of temperature of the medium between the two points. The point pairs may be naturally occurring, such as the diametrically opposed edges of a fuel element channel in a sodium-cooled nuclear reactor, or specifically provided. The beam may be at glancing incidence on a number of point pairs in line and, in this situation, the beam is wider in the direction transverse to its path than it is along its path.

4 Claims, 9 Drawing Figures

REMOTE TEMPERATURE MEASUREMENT

BACKGROUND OF THE INVENTION

This invention relates to ultrasonic temperature measurement.

The invention has arisen in consideration of the severe problems that arise in measuring temperature of coolant flowing in a fast-fission nuclear reactor cooled by liquid sodium. Monitoring of coolant temperature is not only vital for normal control purposes but it is also vital for safety purposes as temperature trends and transients can foreshadow the onset of incidents like blockage of coolant flow which might cause solid nuclear fuel to melt if corrective or preventative action is not taken. Various solutions to these problems have been considered such as reliance on flowmeter or thermocouple readings or by the acoustic detection of coolant boiling. However, with these known solutions uncertainties may arise especially where the normal flow is low, or there is cross-flow in which a normal flow could mask an abnormal flow. These uncertainties are increased when, as is often the case, the flow or temperature measuring device cannot be located precisely at the most sensitive localities (which are usually the discharge points of flow from defined channels into bulk zones) because of access or obstruction problems.

Whilst, current practice does not itself involve any hazards, as the acceptable margin of safety can be suitably achieved, improved standard is continuously being sought. The present invention provides such an improved standard by the use of ultrasonics which may either replace or work in harness with known systems.

The use of ultrasonic techniques to measure temperature is well known—see, for example, British Patent Specifications Nos. 2114299, 2002118, 1300159, 1202182, 1178529, 1178385 and 1035763. Patent No. 1300159, for instance, is specifically concerned with a device for ultrasonic measurement of the temperature of liquid metal coolant within a nuclear reactor. Such a device suffers from the drawback that it is invasive in the sense that the hardware is physically located at the position at which the temperature measurement is to be made and therefore interferes with the flow conditions prevailing at that position.

FEATURES AND ASPECTS OF THE INVENTION

According to the present invention there is provided a method of measuring temperature within a body of fluid in which ultrasound is transmitted through the fluid and the time taken for the ultrasound to traverse a known distance is translated into a corresponding temperature value, said method being characterised in that, to measure temperature at a selected zone or zones within said body of fluid, which zone or zones are demarcated by elements located at a known separation distance or distances within a containment structure for said body of fluid;

(a) ultrasound is launched into the fluid medium at a location which is physically discontiguous with said zone(s) whereby the ultrasound propogates towards said zone(s) and undergoes reflection by said elements; and (b) the resulting ultrasound echoes are identified as being derived from a particular zone or zone(s) and the elapsed time therebetween is translated into a temperature value.

The invention takes as its starting point the known fact that the sonic velocity is sodium (or other liquid for that matter) is a function of its temperature. The invention uses ultrasonic beams from an interrogating ultrasonic transducer or transducers which can be sighted on said elements (for example the opposite sides of a channel containing nuclear fuel swept by sodium coolant or reflectors specifically in the channel). By measurement of the time difference between echoes received back from the elements demarcating each zone, together with a knowledge of the distance apart of the elements, sonic velocity can be calculated and hence the means temperature between those points determined. It is also possible, because of the short time required to make a measurement, to monitor temporal fluctuations ("temperature noise" as it is sometimes called) which is a sensitive method of detecting local overheating. The beams from the interrogating transducers may be sighted to be penetrating or to be at a glancing incidence, the latter being very advantageous for measuring temperatures at an outlet from a channel.

Where a number of zones lie on a common line which can be sighted along by a single interrogating transducer beam, it is possible for a number of temperature measurements to be taken and presented or recorded simultaneously.

Interrogating transducers may be individual to each zone, or they may be arranged, e.g. on a sweep arm, so as to scan a multiplicity of zones.

DESCRIPTION OF THE DRAWINGS

The invention will now be described further with reference to the accompanying drawing in which.

DESCRIPTION OF THE PREFERRED EMBODIMENT

Figure 1:
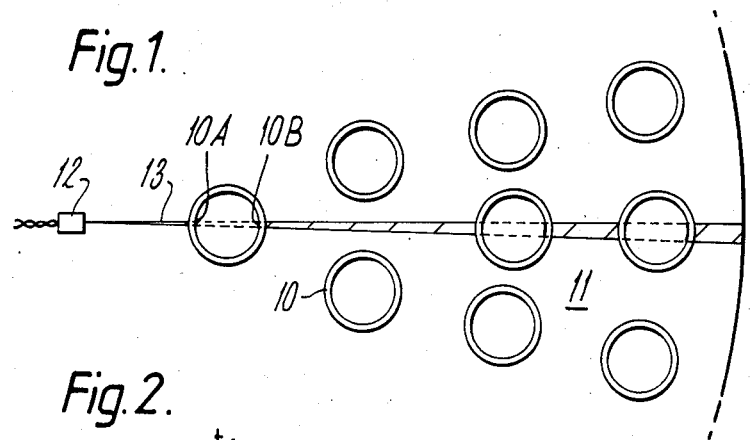
FIGS. 1 and 2 are diagrams in plan and elevation respectively showing operation of the invention by glancing incidence on surfaces naturally present.
Figure 2:
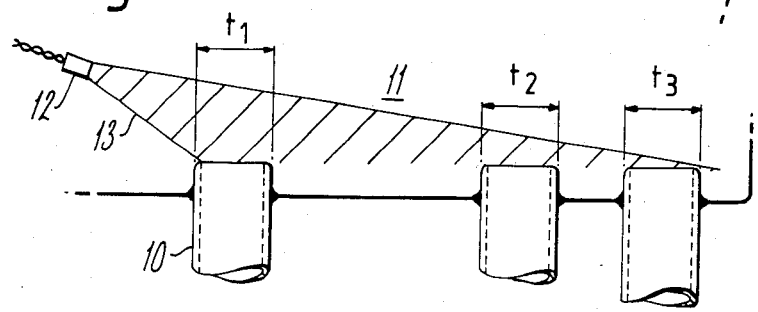

In FIGS. 1 and 2 of the drawings, the upper portions of a number of fuel or breeder sub-assembly wrappers or channels 10 are shown which each discharge liquid sodium coolant into a bulk volume 11. An interrogating ultrasonic transducer 12 immersed in liquid sodium in the bulk volume 11 emits a beam 13 of ultrasonic pulses which is narrow as viewed in FIG. 1 but wider as viewed in FIG. 2. This beam glances over the outlet ends of the channels 10 and returns echoes from diametrically-opposed edges 10A and 10B on each channel. The edges can be considered as locality point pairs. By measuring the time intervals t1, t2 and t3 and with knowledge of the diameter of the channels, it is possible to resolve the means temperature of sodium issuing from the outlets of the channels 10 non-invasively and before any significant cross-flow can take place.

Figure 3:
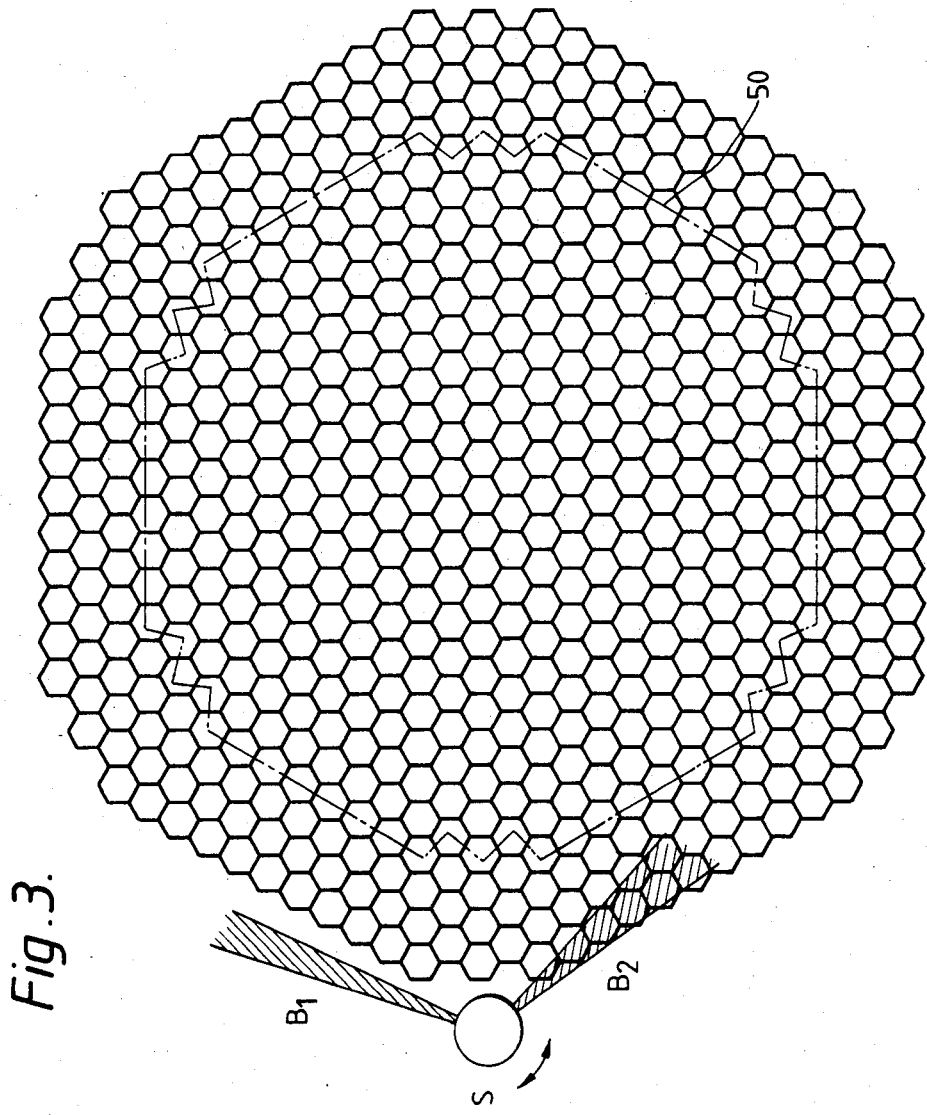
FIG. 3 is a plan view of a fast reactor fuel assembly in which temperature measurement of the breeder sub-assemblies at the periphery of the core are monitored.

FIG. 3 shows a plan of a fast reactor core comprising a hexagonal array of fuel and breeder material sub-assemblies. The upper parts of the fuel or breeder sub-assemblies are of cylindrical shape, their lower ends terminate in spikes for engagement in a diagrid structure of the reactor and they are of hexagonal section over the remaining length. The inner sub-assemblies are assigned to reactor fuel and control devices, the outer three 'rings' of sub-assemblies, i.e. those outside the phantom line 50, are assigned to breeder fuel. The construction of the reactor in this embodiment may be such that the temperatures of the inner sub-assemblies are measured by thermocouples, whereas the breeder sub-assembly temperatures are to be measured by ultrasonics.

As shown, a device S is provided for emitting two ultrasonic beams, B1 and B2. It may comprise waveguides or immersed transducers suitable for sodium and operating in transmit-receive mode. The beams are made to sweep over the outer breeder sub-assemblies by oscillating the device S clockwise and anticlockwise alternately. A device similar to S may be placed at every vertex (or every alternate vertex) of the hexagonal array, so that the devices S may collectively scan all of the breeder sub-assemblies by means of beams B1 and B2.

Figure 4:
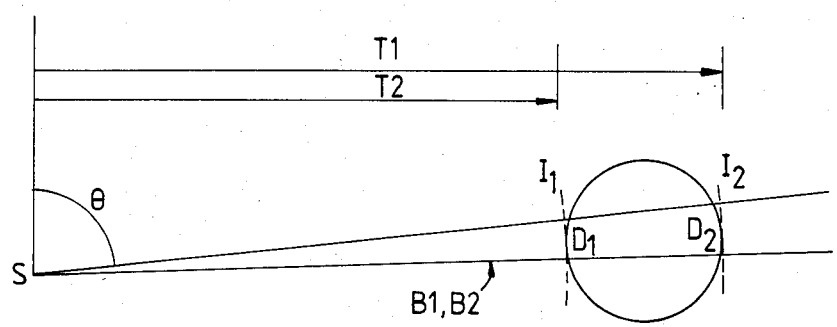
FIG. 4 is a diagrammatic plan view illustrating scanning of the top portion of a single sub-assembly.

In order to understand the function of the electronics used to realise the measurement, the problem of examining the echoes from one sub-assembly will be described with reference to FIG. 4. The ultrasonic beam from the scanning source S gives rise to echoes as a result of reflection from the 'high spots' on the sub-assembly top at D1 and D2. The echo times T1 and T2 are to be measured so that their difference can be computed for the temperature determination. By knowing the angle of direction $\theta$ of the beam from some known reference direction, and from the pulse-echo times, it is possible to calculate the location of the high spots D1 and D2 (i.e. points at which the reflecting surfaces are normal to the beam), and plot them as an ultrasonic image of the area. In practice, because of the divergence of the beam, the image obtained of the high spots would be two 'streaks', I1 and I2. It should be noted that whilst the image is streaked, the echoes always arise from the high spots, but these may reflect from edge rays of the actual sonic beam.

Figure 5:
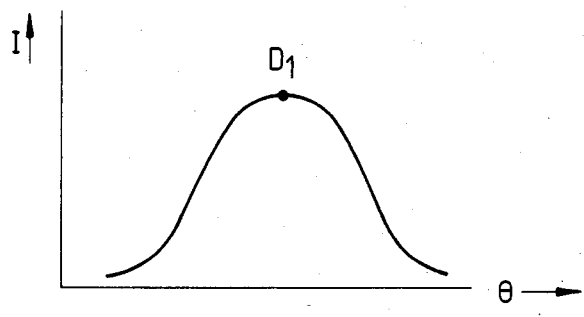
FIG. 5 is a graph showing variation of echo intensity with the incident angle 0 of the scanning beam.

The exact orientation of the high spots may be determined by examining the intensity I of the reflected signal. FIG. 5 shows how this would vary with the direction of the beam for one high spot, D1. The maximum signal is obtained when the central ray of the beam is pointing directly at the high spot, and so the orientation of the point D1 can be determined in terms of the angle $\theta$. The time difference T1−T2 between the signals from both D1 and D2 provides an indication of the sonic velocity, and hence fluid temperature, whether the echoes arise from the central ray of the beam or not. In most cases this would be true, but when the beam is not pointing directly at the high spots, it may also be reflecting from an adjacent sub-assembly, and confusion between signals may occur. Consequently the need to identify when the echoes are coming from a correctly pointed beam.

Figure 6:
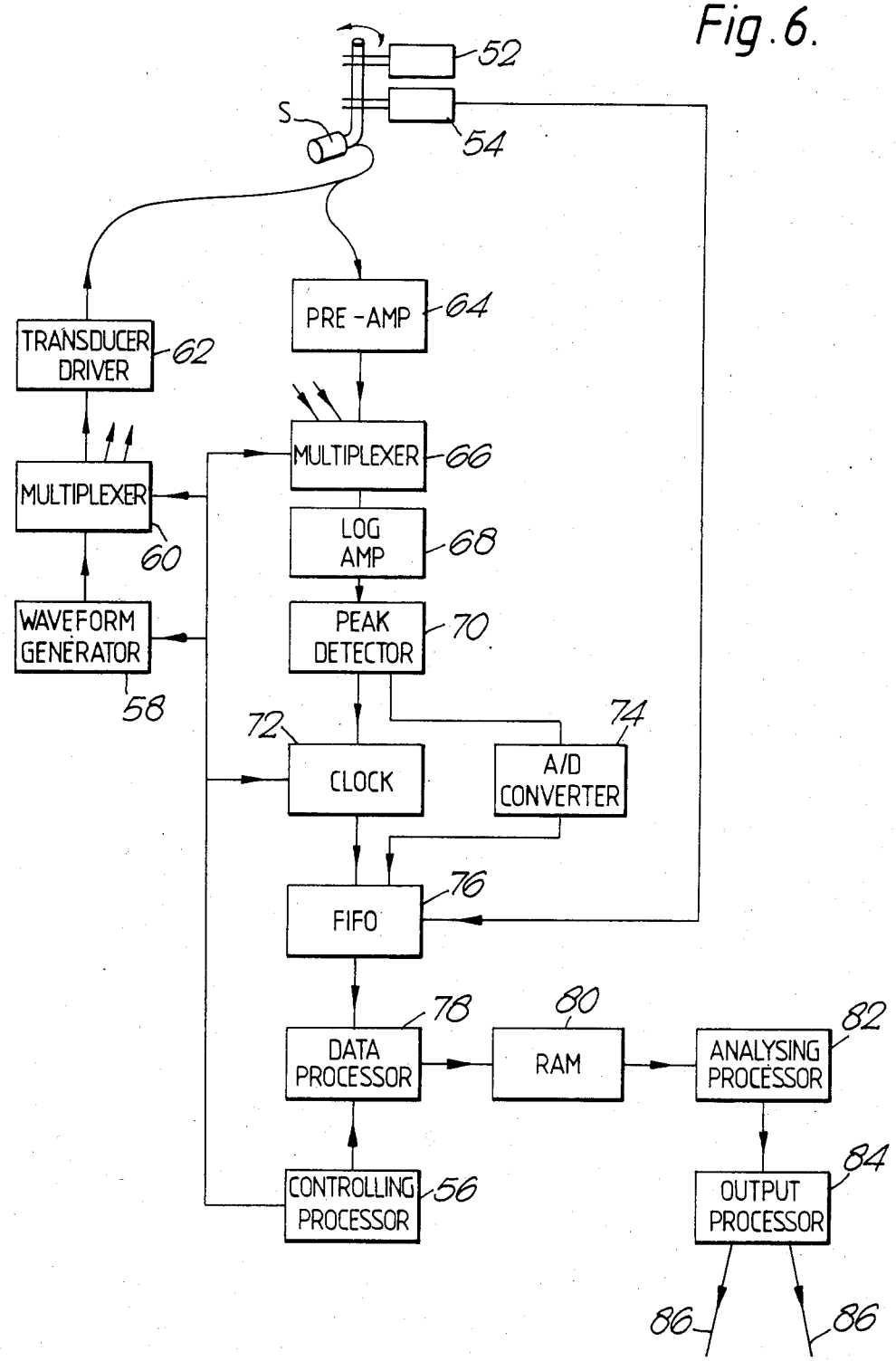
FIG. 6 is a block diagram of electronic circuitry for use in the method of the invention.

The electronic system to identify the echoes and report deduced temperatures is shown diagrammatically in FIG. 6. The scanner S is driven in its oscillatory motion by a motor 52 which may be a stepping motor. For this example, however, the motor is considered free-running. A position encoder 54 on the mechanical drive enables the direction ($\theta$) of the scanning tranducer S to be determined at anytime. The controlling processor 56 (Intel 8086) loads a waveform generator 58 (Namlak type VHR 2195) with data for driving a selected one of the transducers with the optimum pulse shape for accurate timing of echoes. The waveform is then passed to the selected transducer through a multiplexer 60 to a transducer driver 62. The returned echo signals received by the transducer are passed through a pre-amplifier 64 via a multiplexer 66 to a logarithmic response amplifier 68. This has a dynamic range of typically 60-70 db, allowing the entire range of reflected echoes to be accommodated. The individual echoes from targets in the path of the ultrasonic beam are detected by the peak detector 70, which then interrogates a timing clock 72 to obtain a timing for each echo. The amplitude of the echo is digitised by an analogue to digital convertor 74. The entire data for each echo, viz its digitised amplitude, its time since pulsing of the respective transducer, and the position of the scanner S at the time of echo reception are all stored temporarily as a single data 'word' in a First-In-First-Out store (FIFO) 76. Each succeeding echo has its data placed sequentially into the store.

After about 2 milliseconds all echoes of interest from a particular transducer transmit pulse will have been received, but a further 5 milliseconds (say) will elapse before all spurious echoes will have died away, and the same, or an adjacent transducer may then be pulsed. During this period, the data in the FIFO 76 is extracted and interpreted. The approximate location of the wanted echoes will, of course, already be known. A data processor (Intel 8086) 78 recognises the wanted echoes, and stores the precise amplitude and timing data for each in an appropriate table in a random access memory 80. This memory, in effect, stores all the data for all the 'streak' images described earlier in tabulated form. As the scanning device S moves, and the transducers are pulsed, these tables are updated with the latest information. When the FIFO 76 is empty, the controlling processor 56 prepares and fires the next transducer pulse.

The random access memory 80 that stores the echo tables is of two-port form. An analysing processor 82 (Intel 8086) examines these tables, deduces the maximum signal for a particular echo (i.e. the peak of a 'streak', cf. FIG. 5), calculates time differences between appropriate echoes, and temperatures for specific fuel assemblies. The processor 82 may operate independently of the remainder of the system so that it can apportion its time to suit various purposes. For example, it can devote more time to examining the temperature variations (temperature noise) of a particular sub-assembly, or more time to the more critical breeder sub-assemblies. It may, of course, apply different significance to the temperatures deduced for different assemblies, e.g. apply a different threshold for instituting different types of output signal (e.g. alarm signals) for alerting operators and/or automatic control of the reactor.

An output processor 84 (Intel 8087) via output lines 86 may drive alarm and possibly reactor shut-down facilities. In addition, various displays and hard-copy output for information and experimentation may be provided via the output lines 86.

Figure 7:
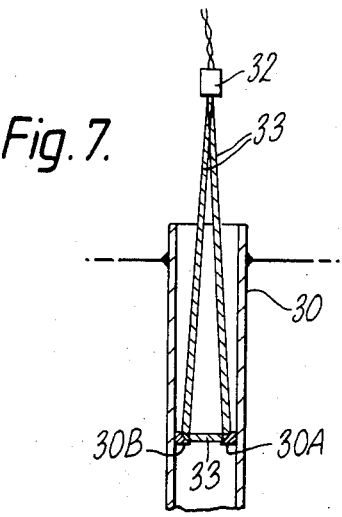
FIG. 7 is a diagram showing operation of the invention using specifically provided reflectors.

In FIG. 7 a fuel channel 30 is fitted internally with two reflectors 30A, 30B. These are interrogated by an ultrasonic beam 33 from a transducer 32 enabling temperature or temperature noise in the region of the channel between the reflectors to be measured. Reflector 30A has a horizontal face (so that some of the beam 33 is reflected back along its path of incidence) and an inclined face (so that some of the beam 33 is reflected to reflector 30B). Reflector 30B simply has an inclined face.

Figure 8:
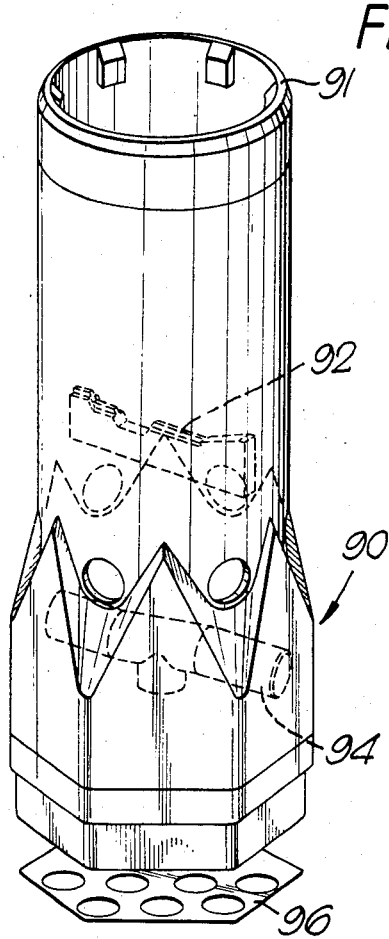
FIG. 8 is an isometric view of a sub-assembly top portion.
Figure 9:
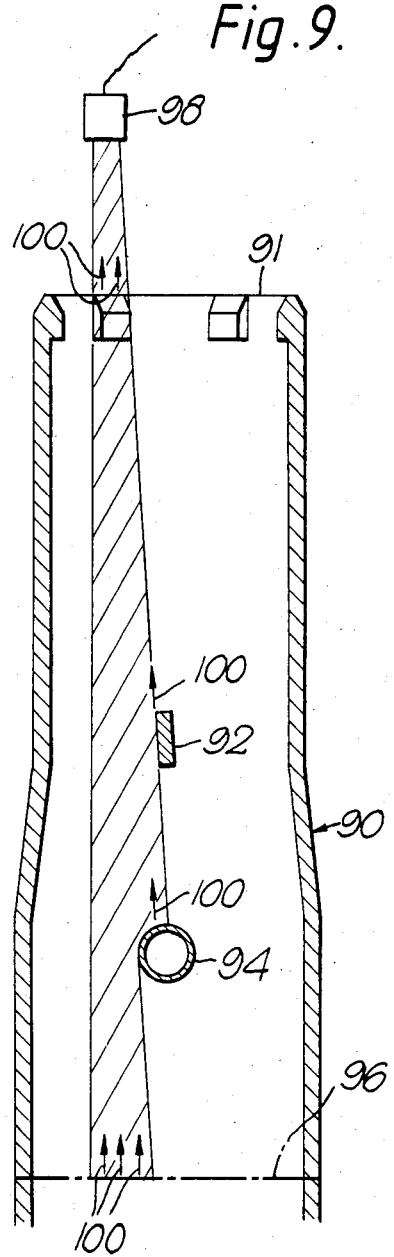
FIG. 9 illustrates diagrammatically an alternative embodiment similar to FIG. 7 but employing structural parts of the sub-assembly as reflectors.

FIG. 8 shows a general view of the top portion of a fast reactor sub-assembly 90, and identifies the top edge 91 (which forms the outlet of the sub-assembly and may be castellated), an orientation bar 92, a burst pin detection pipe 94, and a plate 96 which retains the breeder fuel. As shown in FIG. 9, a transmit-receive transducer 98 can be located (as indicated by arrows 100) from two or more of these features. Thus it is possible to obtain the time difference, and hence temperature information required since the separation distances between the targets 91, 92, 94 and 96 will be accurately known. Thus, a transducer can be placed to obtain echoes from all four targets simultaneously.

In each of the embodiments described, it will be noted that the ultrasound source is physically discontiguous with the zone or zones at which temperature measurements are to be made, i.e. in the sense that the ultrasound is coupled from a remote location to the zone or zones through the fluid itself without relying on any intermediary structure which would otherwise interfere with fluid flow through such zones.

We claim:

1. A method of measuring coolant fluid temperatures, said fluid emerging from outlets of an array of generally parallel fuel/breeder sub-assembly wrappers forming a core of a nuclear reactor, said method comprising projecting a beam of pulsed ultrasound transversely across the core at glancing incidence to said outlets of the wrappers and scanning said beam in a direction perpendicular to the beam direction whereby the beam propagates across the wrapper outlets in the array and undergoes reflection at diametrically-opposed edge portions of each of a plurality of said outlets located in different zones of the array, detecting echo signals produced as a result of such reflections, recording the timing of the echo signals with respect to pulsing of the beam, analysing the echo signals to relate them with the edge portions of respective wrapper outlets, and translating the timings of the so related echo signals into a temperature value for the coolant fluid emerging from the respective wrapper outlet.

2. A method as claimed in claim 1 wherein analysing the echo signals includes identifying those echo signals obtained when the scanned beam is normal to the diametrically-opposed edge portions.

3. In a nuclear reactor, apparatus for measuring coolant fluid temperatures, said fluid emerging from outlets of an array of generally parallel fuel/breeder sub-assembly wrappers forming a core of the nuclear reactor, said apparatus comprising ultrasonic transmit/receive transducer means for projecting a beam of pulsed ultrasound transversely across the core at glancing incidence to said outlets of the wrappers, means for effecting scanning of said beam in a direction perpendicular to the beam direction whereby the beam propagates across the wrapper outlets in the array and undergoes reflection at diametrically-opposed edge portions of each of a plurality of said outlets located in different zones of the array, means for detecting echo signals produced as a result of such reflections, means for recording the timing of the echo signals with respect to pulsing of the beam, means for analysing the echo signals to relate them with the edge portions of respective wrapper outlets, and means for translating the timings of the so related echo signals into a temperature value for the coolant fluid emerging from the respective wrapper outlet.

4. An apparatus as claimed in claim 3 wherein said analysing means includes means for identifying those echo signals obtained when the scanned beam is normal to the diametrically-opposed edge portions.

* * * * *